(12) United States Patent
Sudo et al.

(10) Patent No.: US 9,926,895 B2
(45) Date of Patent: Mar. 27, 2018

(54) INTAKE APPARATUS FOR ENGINE

(71) Applicant: MAZDA MOTOR CORPORATION, Hiroshima (JP)

(72) Inventors: Daiki Sudo, Hiroshima (JP); Takao Kadoishi, Hiroshima (JP); Fusatoshi Tanaka, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 65 days.

(21) Appl. No.: 14/950,162

(22) Filed: Nov. 24, 2015

(65) Prior Publication Data
US 2016/0153409 A1 Jun. 2, 2016

(30) Foreign Application Priority Data

Nov. 27, 2014 (JP) .................................. 2014-240275

(51) Int. Cl.
*F02M 35/104* (2006.01)
*F02M 35/10* (2006.01)
(Continued)

(52) U.S. Cl.
CPC ...... *F02M 35/104* (2013.01); *F02M 35/1036* (2013.01); *F02M 35/10216* (2013.01);
(Continued)

(58) Field of Classification Search
CPC ....... F02M 35/10321; F02M 35/10314; F02M 35/10347; F02M 35/104
(Continued)

(56) References Cited

U.S. PATENT DOCUMENTS

| 5,630,387 A * | 5/1997 | Kamiyama ...... F02M 35/10111 123/184.38 |
| 6,776,132 B2 * | 8/2004 | Kudo ............... F02M 35/10111 123/184.42 |

(Continued)

FOREIGN PATENT DOCUMENTS

| JP | 2006-291915 A | 10/2006 |
| JP | 2008008164 A * | 1/2008 |
| JP | 2012-158994 A | 8/2012 |

OTHER PUBLICATIONS

An Office Action; "Notification of Reasons for Refusal," issued by the Japanese Patent Office dated Jan. 31, 2017, which corresponds to Japanese Patent Application No. 2014-240275 and is related to U.S. Appl. No. 14/950,162; with English language translation.

*Primary Examiner* — Jacob Amick
*Assistant Examiner* — Charles Brauch
(74) *Attorney, Agent, or Firm* — Studebaker & Brackett PC (57) ABSTRACT

Disclosed is an intake apparatus for an engine transversely mounted within an engine compartment at a front of a vehicle. The intake apparatus comprises: an intake manifold made of a synthetic resin and disposed on a front side of the engine, the engine front side being a front side of the vehicle; and a fuel distribution pipe disposed between the engine and the intake manifold to extend in the cylinder row direction and capable of delivering fuel to respective cylinders of the engine; wherein the intake manifold has a protruding portion provided on a front surface thereof to protrude from the front surface in a vehicle forward direction, wherein the protruding portion is provided at a position capable of allowing a member disposed in front of the intake manifold to come into collision therewith in the event of a vehicle frontal collision.

20 Claims, 8 Drawing Sheets

(51) Int. Cl.
*F02M 35/16* (2006.01)
*B60K 13/02* (2006.01)
*B60K 5/04* (2006.01)

(52) U.S. Cl.
CPC .... *F02M 35/10321* (2013.01); *F02M 35/161* (2013.01); *B60K 5/04* (2013.01); *B60K 13/02* (2013.01); *B60Y 2306/01* (2013.01); *F02M 35/10314* (2013.01); *F02M 35/10347* (2013.01)

(58) Field of Classification Search
USPC .................................................. 123/184.61
See application file for complete search history.

(56) References Cited

U.S. PATENT DOCUMENTS

| | | | | |
|---|---|---|---|---|
| 2003/0010309 | A1* | 1/2003 | Tsukii | F02M 35/10032 |
| | | | | 123/184.42 |
| 2004/0159299 | A1* | 8/2004 | Uchiyama | F02M 25/06 |
| | | | | 123/184.42 |
| 2004/0159302 | A1* | 8/2004 | Horibe | F02M 35/10078 |
| | | | | 123/195 C |
| 2010/0139602 | A1* | 6/2010 | Choi | F02M 35/10052 |
| | | | | 123/184.47 |
| 2013/0313840 | A1* | 11/2013 | Kashiwagi | B60R 19/34 |
| | | | | 293/133 |

\* cited by examiner

INTAKE APPARATUS FOR ENGINE

TECHNICAL FIELD

The present invention relates to an intake apparatus for an engine.

BACKGROUND ART

Heretofore, when transversely mounting an engine within an engine compartment at a front of a vehicle in such a manner as to allow a cylinder row direction to be oriented in a vehicle width direction, it has been a common practice to install the engine such that an intake manifold is located on a vehicle forward side of the engine. In order to achieve weight reduction, the intake manifold is made of a synthetic resin. In the case where a so-called direct injection engine configured to directly inject fuel into a combustion chamber is employed as such a transverse-mounted engine, a fuel distribution pipe (so-called "fuel rail") capable of distributing fuel to respective cylinders is disposed between an engine and an intake manifold to extend in a cylinder row direction, wherein the fuel distribution pipe and the intake manifold are located in adjacent relation to each other.

Thus, in the event of a vehicle frontal collision, a radiator and others arranged in front of the intake manifold come into collision with the intake manifold, so that an impact of the inter-component collision is likely to cause the intake manifold to be displaced rearwardly, resulting in interference between the intake manifold and the fuel distribution pipe.

A structure of an intake manifold for resolving the risk of the interference is disclosed in JP 2012-158994A. The intake manifold described in JP 2012-158994A is constructed by joining a near-side divided segment on a near side with respect to an engine and a far-side divided segment on a far side with respect to the engine together, wherein the far-side divided segment is set to have strength less than that of the near-side divided segment.

In this intake manifold, during a vehicle frontal collision, the far-side divided segment is deformed at an earlier stage. Thus, an impact of the vehicle frontal collision is absorbed by the far-side divided segment to suppress deformation of the near-side divided segment, so that it becomes possible to suppress the occurrence of a situation where the intake manifold comes into interference with a fuel distribution pipe located between the intake manifold and the engine.

However, the intake manifold described in JP 2012-158994A is configured such that a front portion of the far-side divided segment approximately evenly receives the impact of the vehicle frontal collision. Therefore, the far-side divided segment is insufficient in terms of deformability, i.e., it cannot be said that the intake manifold has sufficient impact absorption capability.

SUMMARY OF INVENTION

The present invention has been made in view of the above circumstance, and an object thereof is to provide an engine intake apparatus capable of enhancing impact absorption capability of an intake manifold during a vehicle frontal collision, thereby more reliably suppressing the occurrence of a situation where the intake manifold comes into interference with a fuel distribution pipe.

In order to solve the above problem, the present invention provides an intake apparatus for an engine transversely mounted within an engine compartment at a front of a vehicle in such a manner as to allow a cylinder row direction to be oriented in a vehicle width direction. The intake apparatus comprises: an intake manifold made of a synthetic resin and disposed on a front side of the engine, the engine front side being a front side of the vehicle; and a fuel distribution pipe disposed between the engine and the intake manifold to extend in the cylinder row direction and capable of delivering fuel to respective cylinders of the engine; wherein the intake manifold has a protruding portion provided on a front surface thereof to protrude from the front surface in a vehicle forward direction, wherein the protruding portion is provided at a position capable of allowing a member disposed in front of the intake manifold to come into collision therewith in the event of a vehicle frontal collision.

The present invention makes it possible to enhance impact absorption capability of the intake manifold during a vehicle frontal collision, thereby more reliably suppressing the occurrence of a situation where the intake manifold comes into interference with the fuel distribution pipe.

BRIEF DESCRIPTION OF DRAWINGS

FIGS. 8A to 8C are side views sequentially illustrating states in which the intake manifold in FIG. 3 is gradually fractured, wherein

DESCRIPTION OF EMBODIMENTS

With reference to accompanying drawings, the present invention will now be described in detail, based on a preferred embodiment thereof.

An engine (see FIG. 1) in one embodiment of the present invention is a so-called direct injection engine configured to directly inject fuel into a combustion chamber, and an in-line four-cylinder engine. Further, the engine is a transverse-mounted engine configured to be transversely mounted within an engine compartment at a front of a vehicle in such a manner as to allow a cylinder row direction to be oriented in a vehicle width direction.

Figure 1:
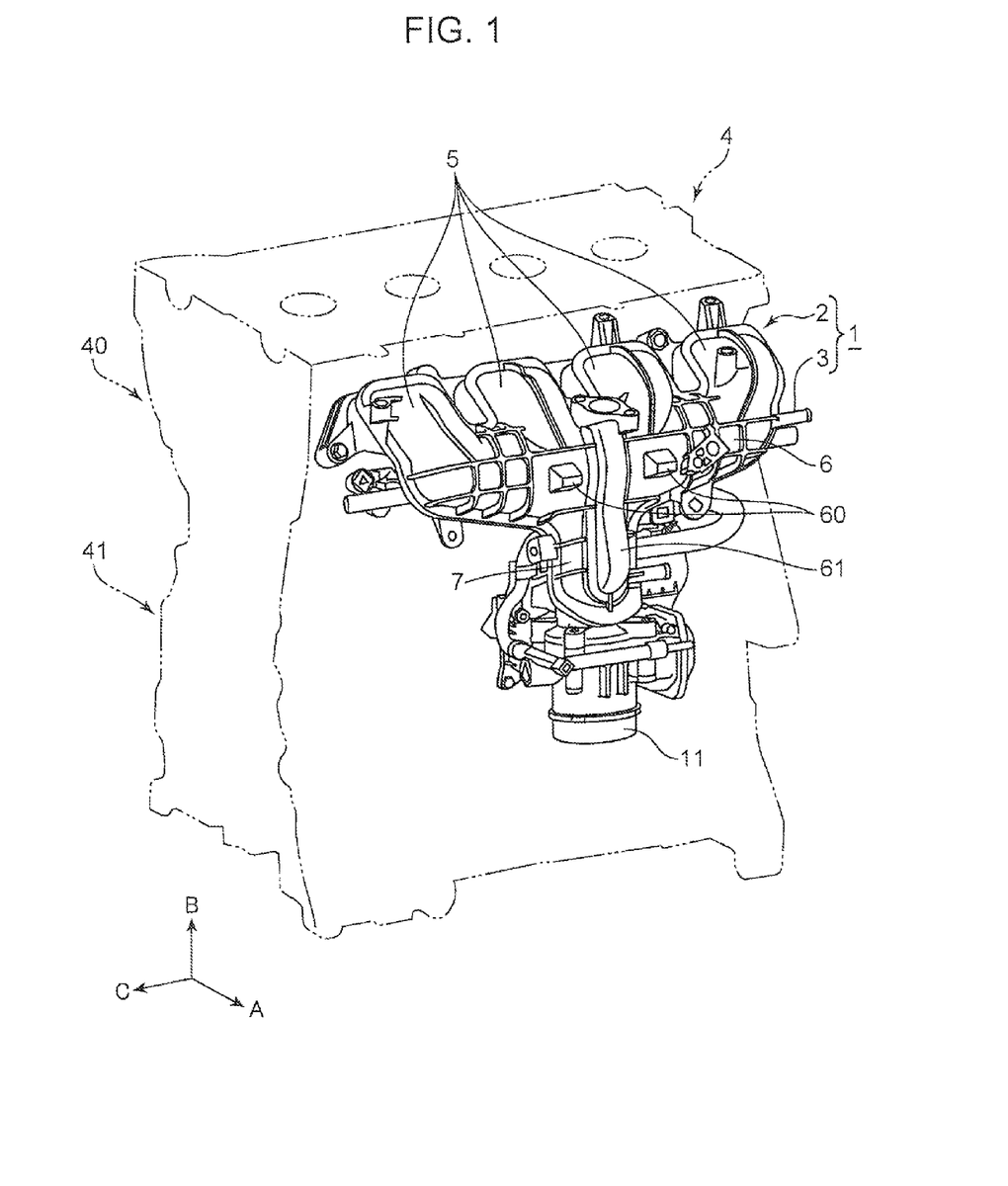
FIG. 1 is a perspective view illustrating an engine and an intake apparatus attached thereto, in one embodiment of the present invention.

The engine 4 comprises a cylinder head 40 formed with four intake ports (not illustrated) and four exhaust ports (not illustrated) and a cylinder block 41 provided on a lower side of the cylinder head 40.

The following description will be made on the assumption that the direction A, the direction B and the direction C in FIG. 1 are, respectively, a vehicle forward-rearward direction, an upward-downward direction, and the cylinder row direction (vehicle width direction).

As illustrated in FIG. 1, an engine intake apparatus 1 according to this embodiment comprises an intake manifold 2 and a fuel distribution pipe 3.

The intake manifold 2 is located on a vehicle forward side of the engine 4.

The fuel distribution pipe 3 (so-called "fuel rail") is disposed between the engine 4 and the intake manifold 2 to extend in the cylinder row direction C, and fixed to a front surface (vehicle forward-side surface) of the engine 4. The fuel distribution pipe 3 is capable of distributing fuel to four injectors associated with respective cylinders of the engine 4. The fuel distribution pipe 3 and the intake manifold 2 are located in adjacent relation to each other, as illustrated in FIG. 3.

The intake manifold 2 will be described in more detail below.

Figure 2:
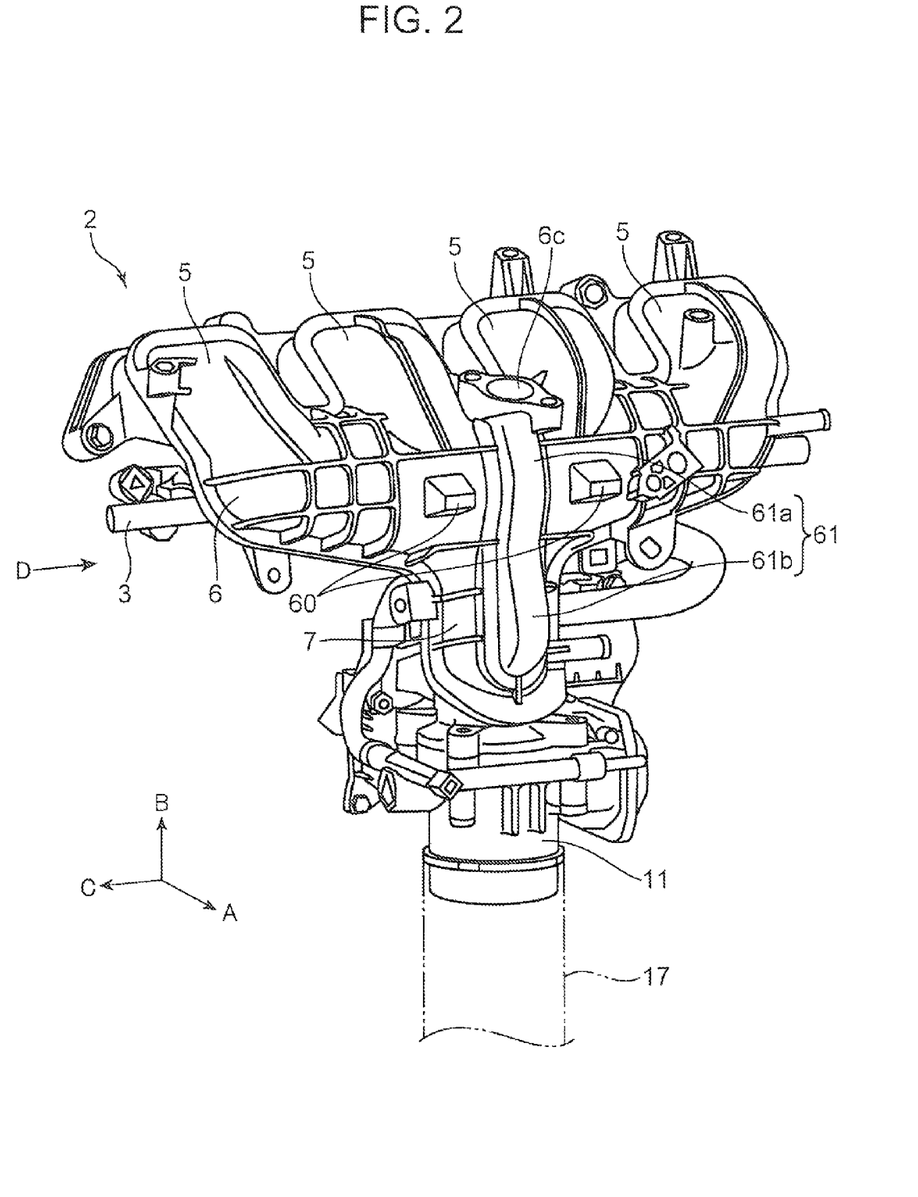
FIG. 2 is a perspective view illustrating the intake apparatus in FIG. 1.

As illustrated in FIG. 2, the intake manifold 2 comprises four intake pipes 5, a surge tank 6 and an intake air introduction pipe 7. With a view to weight reduction, the intake manifold 2 is made of a synthetic resin material.

Figure 3:
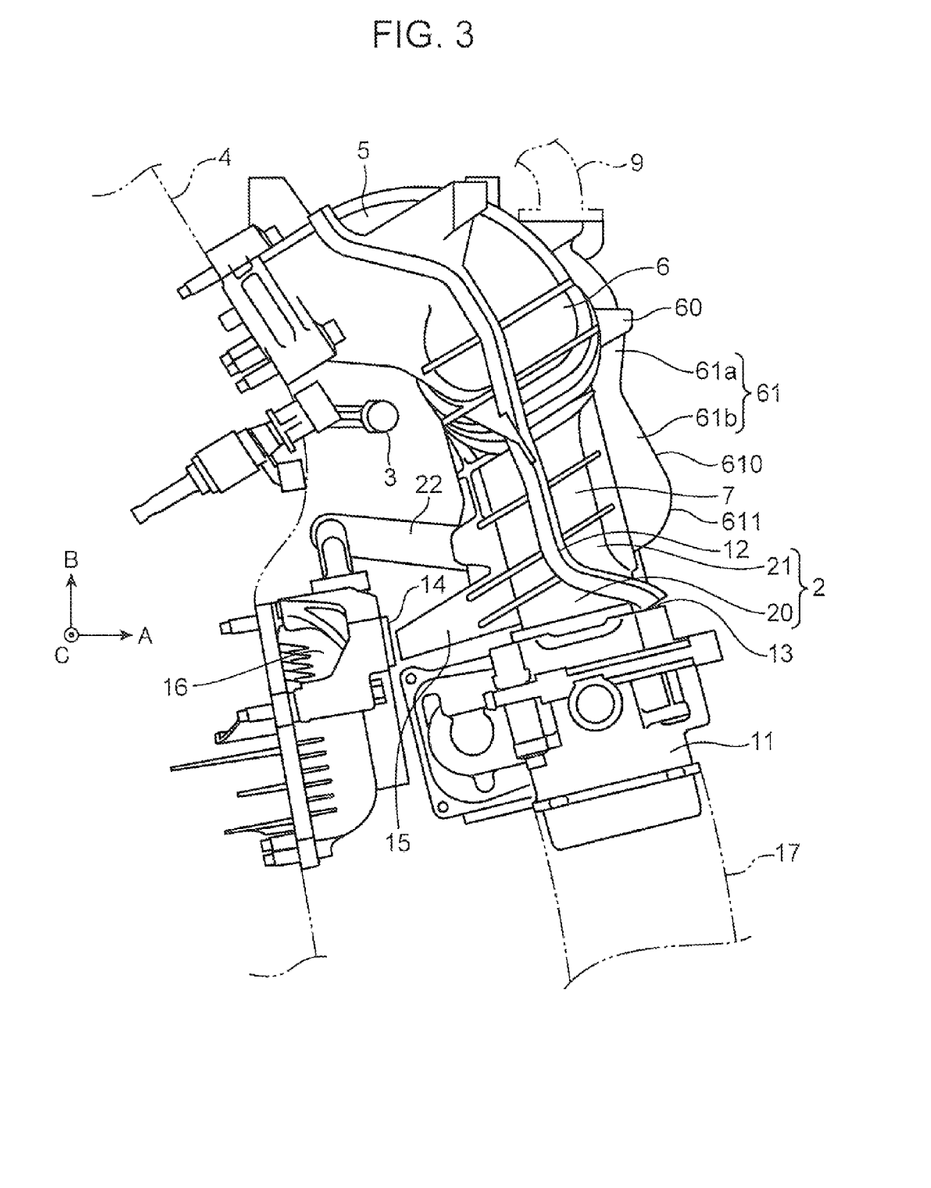
FIG. 3 is a side view of the intake apparatus illustrated in FIG. 2, when viewed in the direction D in FIG. 2.

As illustrated in FIG. 3, the intake pipes 5, the surge tank 6 and the intake air introduction pipe 7 are composed of a rear divided segment 20 on a near side with respect to the engine 4, and a front divided segment 21 on a far side with respect to the engine 4. The rear divided segment 20 and the front divided segment 21 are integrated together by means of vibration welding.

That is, the rear divided segment 20 is composed of respective portions of the intake pipes 5, the surge tank 6 and the intake air introduction pipe 7 on the near side with respect to the engine 4. On the other hand, the front divided segment 21 is composed of respective remaining portions of the intake pipes 5, the surge tank 6 and the intake air introduction pipe 7 on the far side with respect to the engine 4.

The front divided segment 21 has a wall thickness less than that of the rear divided segment 20. For example, the wall thickness of the front divided segment 21 is set to 2 mm, and the wall thickness of the rear divided segment 20 is set to 3.5 mm. As a result, strength of the front divided segment 21 becomes less than strength of the rear divided segment 20.

As illustrated in FIG. 3, in each of the intake pipes 5 and the surge tank 6, a boundary line 12 between the front divided segment 21 and the rear divided segment 20 is located in a central region thereof in a vehicle forward-rearward direction A. In a portion of the intake air introduction pipe 7 ranging from a downstream end to a longitudinally central region thereof, the boundary line 12 is located in the same manner.

On the other hand, the boundary line 12 is inclined to gradually come close to a front surface of the intake air introduction pipe 7, in a direction from the longitudinally central region toward an upstream end of the intake air introduction pipe 7. Then, in the vicinity of the upstream end of the intake air introduction pipe 7 (position slightly downstream of the upstream end), the boundary line 12 reaches the front surface (vehicle forward-side surface) of the intake air introduction pipe 7.

That is, in a portion of the intake air introduction pipe 7 ranging from the vicinity of the upstream end to the upstream end thereof, both of a region near to the engine 4 and a region far from the engine 4 are (i.e., the entire peripheral wall of the intake air introduction pipe 7 is) formed as the rear divided segment 20.

As illustrated in FIG. 1, downstream ends of the four intake pipes 5 are connected, respectively, to the four intake ports provided in the cylinder head 40 of the engine 4. Thus, each of the intake pipes 5 can supply a mixed gas of fresh air, EGR (Exhaust Gas Recirculation) gas and blow-by gas.

The intake pipes 5 are fixed to the cylinder head 40, so that the intake manifold 2 is supported by the cylinder head 40 in a cantilevered state. That is, the surge tank 6 and the intake air introduction pipe 7 are indirectly supported with respect to the engine 4 through the intake pipes 5, instead of being directly supported by the engine 4.

A knock sensor (not illustrated) operable to detect knocking is installed in a front surface (vehicle forward-side surface) of the cylinder block 41 at a position slightly above an aftermentioned oil separator 6 (see FIG. 3). In the cantilevered state, the cylinder block 41 of the engine 4 and the intake air introduction pipe 7 are not directly coupled together. This prevents a change in rigidity of the cylinder block 41 in the vicinity of an installation area of the knock sensor. Thus, it becomes possible to allow the knock sensor to accurately detect knocking. It also becomes possible to suppress the occurrence of a situation where vibration is input from the cylinder block 41 into an aftermentioned throttle valve 11a (see FIG. 4) requiring high opening-closing accuracy for controlling a power output of the engine 4.

Figure 4:
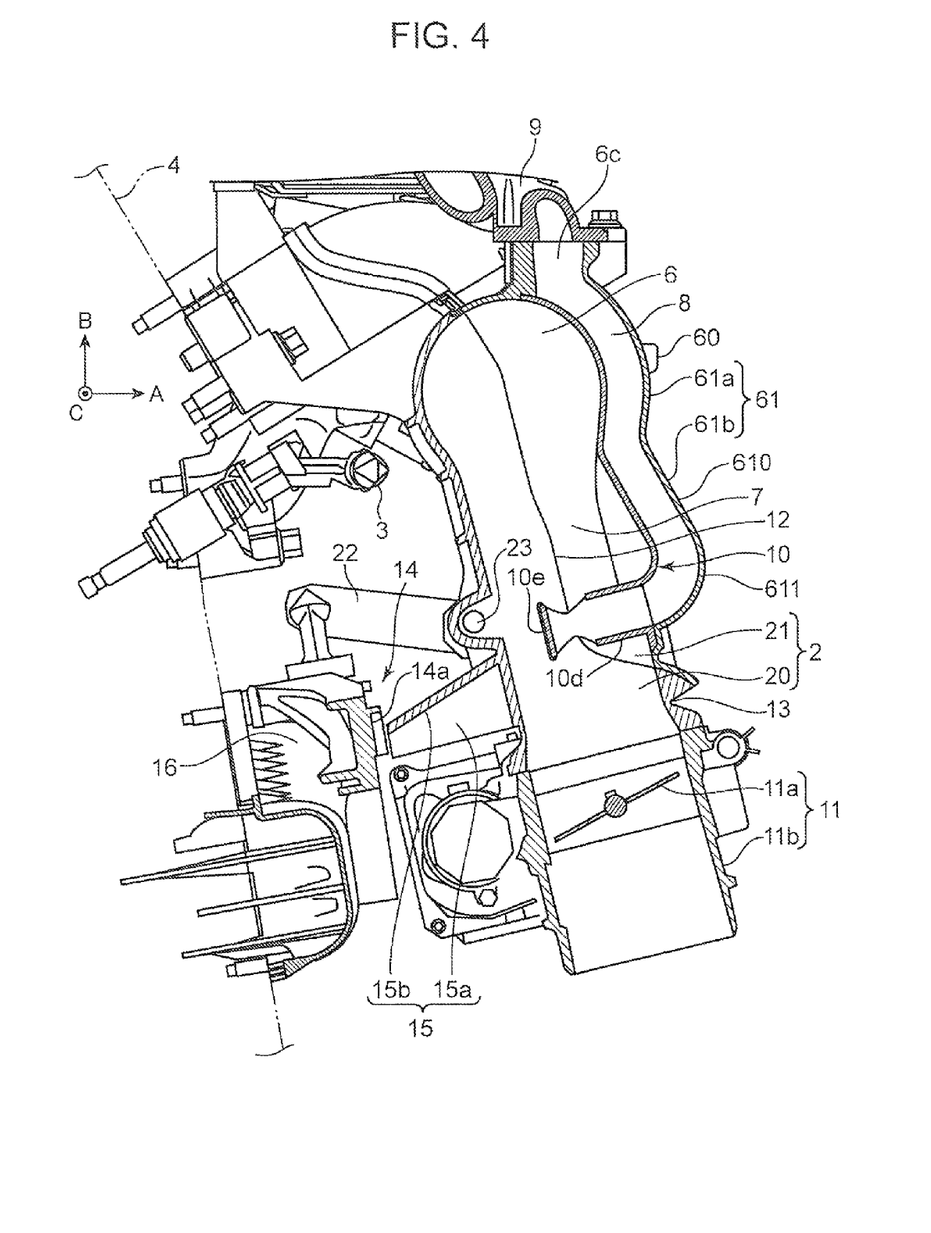
FIG. 4 is a sectional view of the intake apparatus illustrated in FIG. 3, taken along a cut plane passing through a central region thereof in a cylinder row direction.

As illustrated in FIGS. 1 and 2, the surge tank 6 is disposed to extend in the cylinder row direction C, and formed such that a width of the surge tank 6 in an upward-downward direction B gradually decreases, in a direction from a central region thereof in the cylinder row direction C toward each of opposite ends thereof in the cylinder row direction C. As illustrated in FIGS. 3 and 4, the surge tank 6 has a front surface (vehicle forward-side surface) formed in an arc shape convexed in a vehicle forward direction when viewed in the cylinder row direction C.

Respective upstream ends of the four intake pipes 5 are connected to an upper surface of the surge tank 6. Connection areas between the surge tank 6 and respective ones of the four intake pipes 5 are arranged in the upper surface of the surge tank 6 along the cylinder row direction C at even intervals.

The downstream end of the intake air introduction pipe 7 is connected to a lower end of the central region of the surge rank 6 in the cylinder row direction C. The surge tank 6 is configured to temporarily store a mixed gas of fresh air, EGR gas and blow-by gas, which is introduced from the intake air introduction pipe 7, and, after further mix the mixed gas, supply the resulting gas to each of the four intake pipes. The surge tank 6 has a gas inlet port 6c formed in an upper portion of an outer wall thereof on the vehicle forward side to introduce EGR gas therethrough. The gas inlet port 6c is located at an upstream end of an aftermentioned gas introduction passage 8.

As illustrated in FIGS. 1 to 4, the surge tank 6 has a protruding portion 60 provided on the front surface (vehicle forward-side surface) thereof to protrude from the front surface in the vehicle forward direction. The protruding portion 60 is provided at a position capable of allowing a radiator (not illustrated) disposed in front (on the vehicle forward side) of the intake manifold 2 to come into collision therewith in the event of a vehicle frontal collision.

The protruding portion 60 is provided in a number of two, wherein the two protruding portions 60 are disposed, respectively, on both sides of the central region thereof in the cylinder row direction C. Each of the protruding portions 60 is provided at a position closer to the central region than a corresponding one of the ends thereof in the cylinder row direction C (provided near to the central region thereof in the cylinder row direction C).

The protruding portion 60 is formed in a shape and a size to allow the radiator disposed in front of the intake manifold 2 to come into collision therewith, substantially without increasing strength of the surge tank 6 (reinforcing the surge tank 6).

In the embodiment illustrated in FIGS. 1 and 2, the protruding portion 60 is formed in a forwardly-narrowed shape in which both dimensions in the upward-downward direction B and the cylinder row direction C (height and width) gradually decrease in the vehicle forward direction, more specifically, a truncated quadrangular pyramid shape tapered in the vehicle forward direction.

In the embodiment illustrated in FIGS. 1 and 2, a protruding length (length in the vehicle forward-rearward direction A) of the protruding portion 60 is set to be about ¼ to ⅓ of a length of the surge tank 6 as measured in the upward-downward direction B at a position of the surge tank 6 where the protruding portion 60 is provided, and to become slightly greater than a protruding length (length in the vehicle forward-rearward direction A) of a partial section 61*a* of an aftermentioned raised portion 61, which is provided on the front surface of the surge tank 6 (see FIGS. 3 and 4). The respective lengths of a base end (boundary with the surge tank 6) of the protruding portion 60 in the upward-downward direction B and in the cylinder row direction C are set to be approximately equal to the protruding length of the protruding portion 60.

The protruding portion 60 is internally hollowed, and a vehicle rearward-side end of the protruding portion 60 is opened to an internal space of the surge tank 6.

As illustrated in FIG. 4, the intake manifold 2 is internally provided with a gas introduction passage 8 capable of introducing EGR gas to an upstream region (inside) of the intake air introduction pipe 7. The gas introduction passage 8 has an upstream end connected to a downstream end of an EGR passage 9. The EGR passage 9 is a path capable of guiding a part of exhaust gas discharged from the exhaust ports of the engine 4 to the gas introduction passage 8 via an EGR cooler (not illustrated) and an EGR valve (not illustrated).

The gas introduction passage 8 is defined by using, as a passage wall, a raised portion 61 formed on respective vehicle forward-side portions of the surge tank 6 and the intake air introduction pipe 7 (on the front divided segment 21), and a guide portion 10*b* (see FIG. 6) of an aftermentioned gas passage-defining member 10. The raised portion 61 is formed on the front surface of the surge tank 6 and the front surface of the intake air introduction pipe 7 in such a manner as to be raised from the respective front surfaces in the vehicle forward direction. The raised portion 61 is formed in such a manner that an inner surface of an outer wall of the front divided segment 21 is bulged outwardly, and thereby an outer surface of the outer wall is raised outwardly.

That is, as illustrated in FIG. 4, the gas introduction passage 8 is defined between the raised portion 61, and a gas passage-defining member 10 provided on the vehicle rearward side of the raised portion 61. That is, a space between the raised portion 61 and the gas passage-defining member 10 serves as the gas introduction passage 8. The gas passage-defining member 10 is integrated with an inner wall surface 7*a* (see FIG. 5) of the surge tank 6 and the intake air introduction pipe 7 by means of vibration welding.

As illustrated in FIGS. 1 and 2, the raised portion 61 is formed with both on the front surface of the surge tank 6 and the front surface of the intake air introduction pipe 7, along a position of the central region of the surge tank 6 in the cylinder row direction C. The raised portion 61 comprises an upper raised section 61*a* raised from the front surface of the surge tank 6 and a lower raised section 61*b* raised from the front surface of the intake air introduction pipe 7. The upper raised section 61*a* extends in the upward-downward direction B along the front surface of the surge tank 6, and the lower raised section 61*b* extends in the upward-downward direction B along the front surface of the intake air introduction pipe 7. The upper and lower raised sections 61*a*, 61*b* are in continuous relation to each other.

As illustrated in FIGS. 3 and 4, the upper raised section 61*a* has a protruding length (length in the vehicle forward-rearward direction A) evenly protruding from the front surface of the surge tank 6, over the entire range in the upward-downward direction B. On the other hand, the lower raised section 61*b* includes an inclined region 610 having a protruding length which gradually increases in a downward direction, and a curved region 611 curved from a lower end of the inclined region 610 toward the intake air introduction pipe 7. The protruding length (length in the vehicle forward-rearward direction A) of a part of the curved region 611 maximally protruding in the vehicle forward direction is greater than each of the protruding length of the upper raised section 61*a* and the protruding length of the protruding portion 60.

Figure 6:
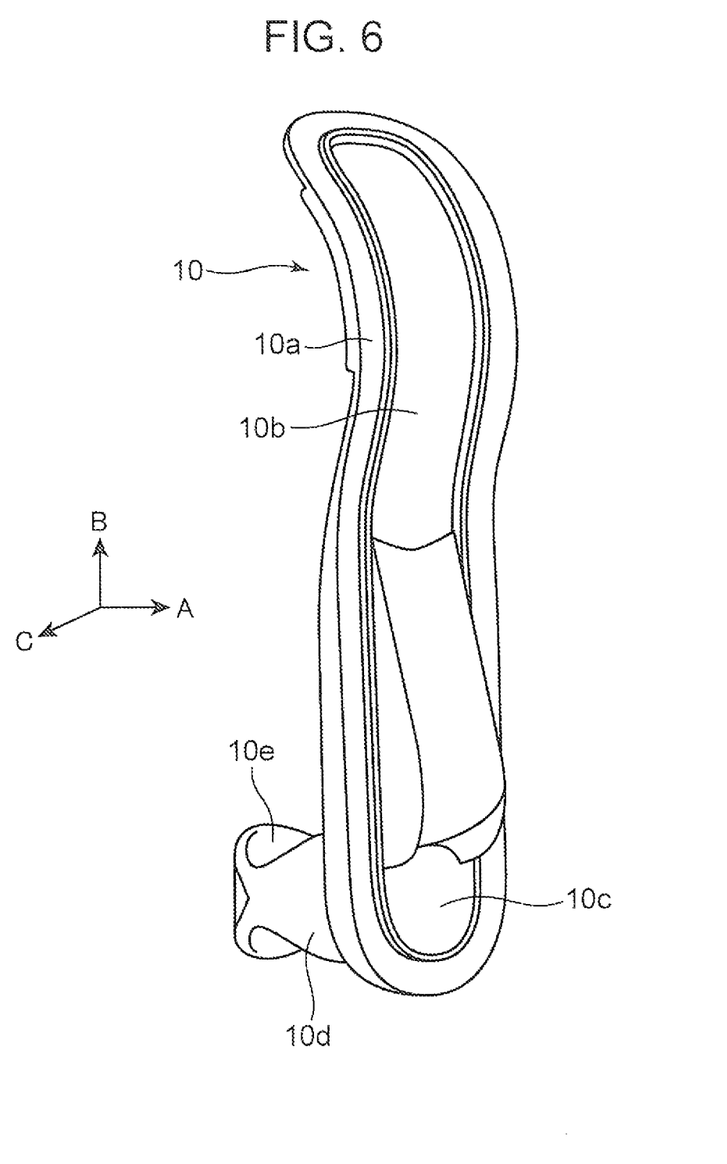
FIG. 6 is a perspective view illustrating a gas passage-defining member for forming a gas introduction passage.

As illustrated in FIG. 6, the gas passage-defining member 10 has a fixing portion 10*a*, a guide portion 10*b*, a through-hole 10*c*, a gas outlet pipe portion 10*d*, and a collision wall portion 10*e*, which are integrally formed using a synthetic resin.

The fixing portion 10*a* is formed into a ring shape along a contour of a base end of the raised portion 61. The fixing portion 10*a* is fixed to the inner wall surface (vehicle rearward-side surface) 7*a* of the surge tank 6 and the intake air introduction pipe 7 (see FIG. 5).

Figure 5:
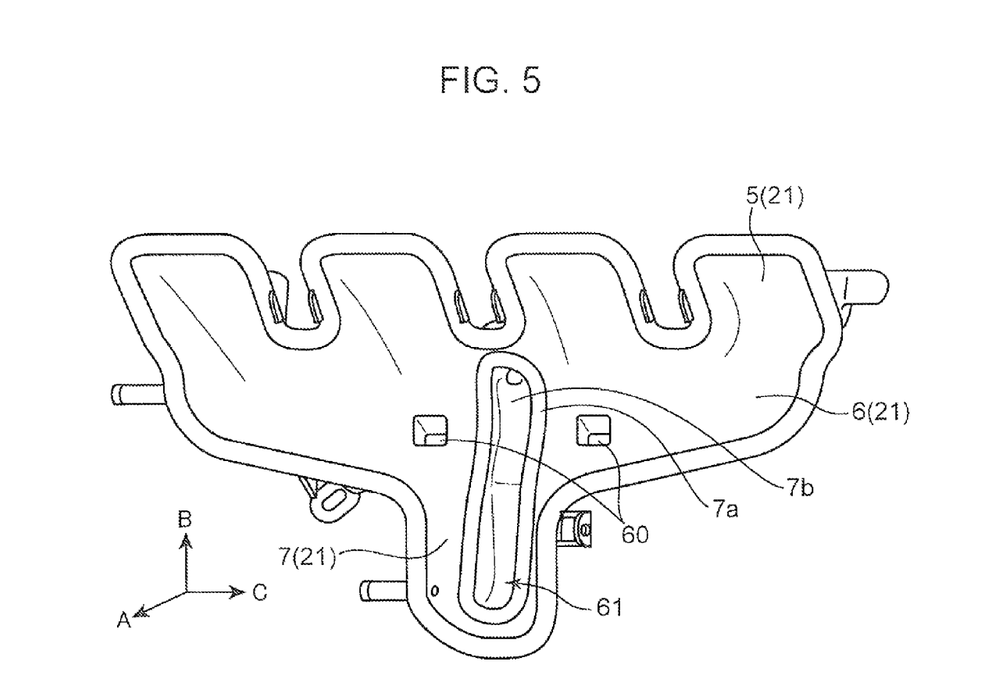
FIG. 5 is a perspective view of a front divided segment of an intake manifold illustrated in FIG. 2, when viewed from an inside (a vehicle rearward side) thereof.

The guide portion 10*b* is a plate-shaped portion opposed to an inner wall surface (vehicle rearward-side surface) 7*b* of the raised portion 61 (see FIG. 5). The guide portion 10*b* has an outer surface (vehicle forward-side surface) with a shape along a ridge line of the raised portion 61.

The through-hole 10*c* is a hole penetratingly extending from a lower end of the guide portion 10*b* in a vehicle rearward direction.

The gas outlet pipe portion 10*d* is a tubular-shaped portion extending from a vehicle rearward-side end of the through-hole 10*c* in the vehicle rearward direction. That is, the gas outlet pipe portion 10*d* extends from outside the intake air introduction pipe 7 toward a radially central region of the intake air introduction pipe 7. A distal end (vehicle rearward-side end) of the gas outlet pipe portion 10*d* is located around the radially central region of the intake air introduction pipe 7.

The collision wall portion 10*e* is a plate-shaped portion curved in a U shape when viewed from thereabove, and opposite ends thereof in the cylinder row direction C are supported by the distal end of the gas outlet pipe portion 10*d*. As illustrated in FIG. 4, the collision wall portion 10*e* is located around the radially central region of the intake air introduction pipe 7.

EGR gas is supplied from the EGR passage 9 into the gas introduction passage 8, and, after flowing through the gas introduction passage 8, discharged from the distal end of the gas outlet pipe portion 10d to come into collision with the collision wall portion 10e. The EGR gas is diffused according to the collision with the collision wall portion 10e, and sufficiently mixed with fresh air supplied to the fresh air introduction pipe 7 via an aftermentioned throttle body 11 (see FIGS. 1 to 4) and blow-by gas supplied to the intake air introduction pipe 7 via an oil separator 6. Thus, a mixed gas formed by sufficiently mixing the fresh air, the EGR gas and the blow-by gas together is supplied into the cylinders of the engine 4 via the surge tank 6 and the intake pipes 5.

The intake air introduction pipe 7 has a lower end (upstream end) connected to an upper end of a throttle body 11. The intake air introduction pipe 7 has a blow-by gas inlet port 23 (see FIG. 4) formed in an outer wall thereof at a position on the vehicle rearward side in the longitudinally central region thereof. The blow-by gas inlet port 23 is connected to a downstream end of a blow-by gas passage 22. The blow-by gas passage 22 is a line capable of guiding, to the intake air introduction pipe 7, blow-by gas after being subjected to removal of lubricating oil through the oil separator 6.

The intake air introduction pipe 7 is capable of mixing fresh air supplied thereto via an air cleaner (not illustrated) and the throttle body 11, with EGR gas and blow-by gas, and introducing the resulting mixed gas into the surge tank 6. The intake air introduction pipe 7 is inclined to extend forwardly and obliquely downwardly, i.e., inclined in such a manner that a longitudinal central axis thereof extends obliquely downwardly in the vehicle forward direction.

As illustrated in FIG. 4, the throttle body 11 comprises a throttle valve 11a operable to adjusting an amount of fresh air after being subjected to removal of dust and the like through the air cleaner, and a cylindrical-shaped valve casing 11b housing and holding throttle valve 11a. The valve casing 11b is inclined to extend forwardly and obliquely downwardly, i.e., inclined in such a manner that a central axis thereof extends obliquely downwardly in the vehicle forward direction. A vehicle forwardmost-side edge of the throttle body 11 (vehicle forwardmost-side edge of the valve casing 11b) protrudes in the vehicle forward direction with respect to each of the protruding portion 60 and the raised portion 61. The throttle body 11 has an upstream end connected to a flexible pipe 17 (see FIGS. 2 and 3) capable of guiding fresh air to the throttle body 11.

The intake air introduction pipe 7 has a weakened portion 13 (see FIGS. 3 and 4) formed in the vicinity of the upstream end of the intake air introduction pipe 7 (rear divided segment 20) along a circumferential direction thereof. The weakened portion 13 is a thin-walled portion formed by reducing a wall thickness of the intake air introduction pipe 7 over the entire circumference thereof.

The wall thickness of the weakened portion 13 is set to be less than that of a remaining portion of the rear divided segment 20, thereby allowing weakened portion 13 to have relatively small strength. The wall thickness can be reduced, for example, by forming a sectionally V-shaped groove (notch) in the intake air introduction pipe 7, as illustrated in FIG. 4.

As illustrated in FIGS. 3 and 4, a load-receiving member 14 is provided behind (on the vehicle rearward side of) the intake air introduction pipe 7 to receive and stop the intake air introduction pipe 7 during a vehicle frontal collision. The load-receiving member 14 is fixed to the vehicle forward-side surface of the cylinder block 41 through the oil separator 16, in such a manner that a load-receiving surface 14a thereof is opposed to a vehicle rearward-side edge face (load transfer surface 15c illustrated in FIG. 7) of an aftermentioned load transfer portion 15.

Figure 7:
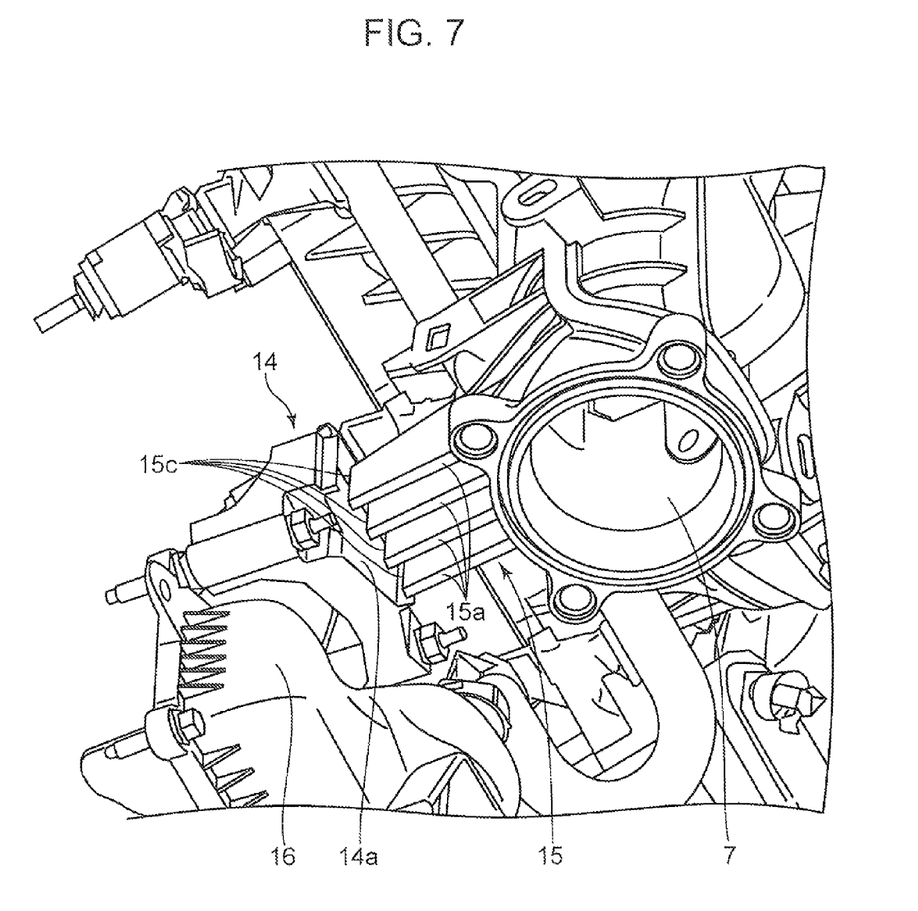
FIG. 7 is a perspective view illustrating a structure around a load-receiving member and a load transfer portion in FIG. 3.

As illustrated in FIGS. 3 and 4, the intake air introduction pipe 7 has a load transfer portion 15 provided on a vehicle rearward-side surface thereof to protrude from the vehicle rearward-side surface in the vehicle rearward direction. As illustrated in FIGS. 4 and 7, the load transfer portion 15 comprises a plurality of protruding plates 15a protruding in the vehicle rearward direction, and a connection plate 15b mutually connecting the protruding plates 15a. Each of the plurality of protruding plates 15a has a vehicle rearward-side edge face formed as a load transfer surface 15c.

As illustrated in FIGS. 3, 4 and 7, there is a slight gap between the load-receiving surface 14a of the load-receiving member 14 and the load transfer surface 15c of the load transfer portion 15. This gap makes it possible to prevent vibration of the engine 4 during engine operation from being directly transferred to the throttle body 11 via the load-receiving member 14 and the load transfer portion 15.

The following description will be made about in what manner the intake manifold 2 is deformed in the event of a vehicle frontal collision.

Figure 8A:
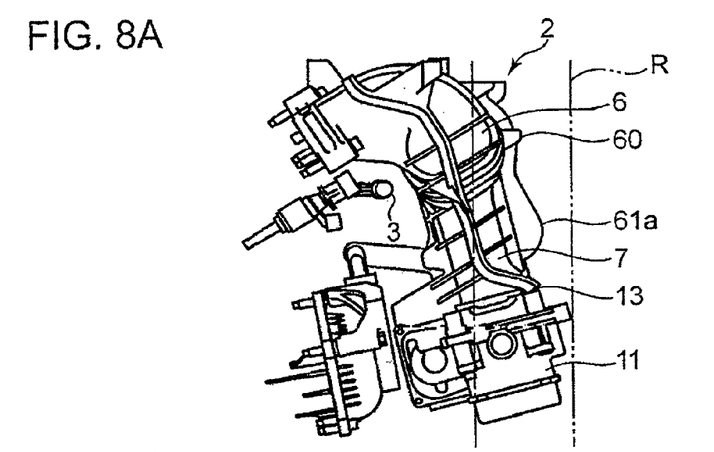
FIG. 8A, FIG. 8B and FIG. 8C illustrate, respectively, a state just after a radiator collides with a throttle body, a state when the throttle body is displaced in a vehicle rearward direction due to an impact of a vehicle frontal collision, and a state when respective vehicle forward-side portions of a surge tank and an intake air introduction pipe collapse due to the impact of the vehicle frontal collision.

In the event of a vehicle frontal collision, the radiator R is displaced in the vehicle rearward direction to come into collision with the throttle body 11, as illustrated in FIG. 8A.

Figure 8B:
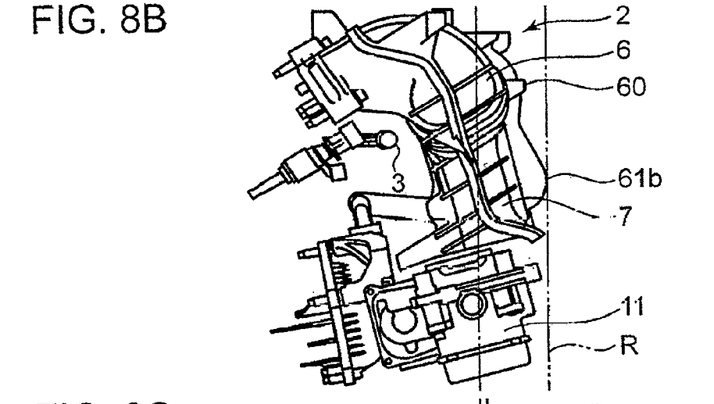

This inter-component collision gives rise to stress concentration on the weakened portion 13 to cause a crack in the weakened portion 13, and the weakened portion 13 is fractured as illustrated in FIG. 8B, so that the throttle body 11 is dropped off from the intake air introduction pipe 7 while being displaced in the vehicle rearward direction. Through the fracture of the weakened portion 13, an impact of the inter-component collision is absorbed to some extent. Because the fracture of the weakened portion 13 is rapidly completed, the intake manifold 2 is not displaced in the vehicle rearward direction.

Then, when the radiator R is further displaced in the vehicle rearward direction, the radiator R comes into collision with the lower raised section 61b. This inter-component collision gives rise to stress concentration on a base end (boundary with the intake air introduction pipe 7) of the lower raised section 61b to causes a crack in the base end, and the base end is fractured. Through this fracture, an impact of the inter-component collision is absorbed to some extent.

Then, when the radiator R is further displaced in the vehicle rearward direction, the crack in the base end of the lower raised section 61b develops therearound and finally over the entire vehicle forward-side portion of the intake air introduction pipe 7.

Then, when the radiator R is further displaced in the vehicle rearward direction, the radiator R comes into collision with the protruding portions 60. This inter-component collision gives rise to stress concentration on the base end (boundary with the surge tank 6) of each of the protruding portions 60 to cause a crack in the base end, and the base end is fractured. Through this fracture, an impact of the inter-component collision is absorbed to some extent.

Then, when the radiator R is further displaced in the vehicle rearward direction, the cracks in the respective base ends of the protruding portions 60 develop therearound and finally over the entire vehicle forward-side portion of the surge tank 6.

Figure 8C:
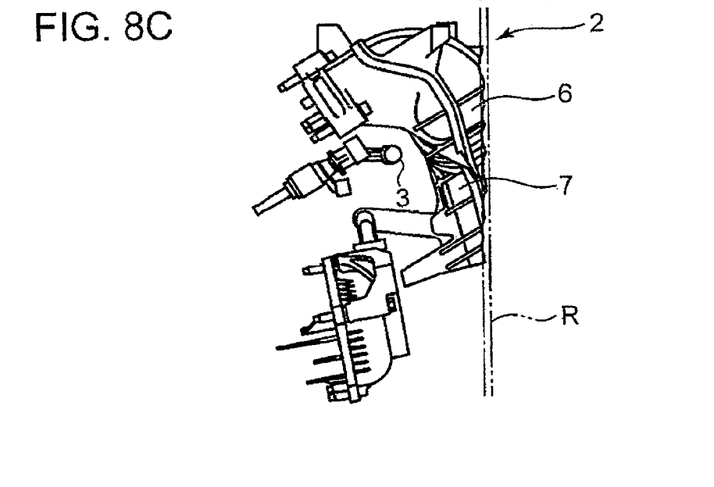

Then, when the radiator R is further displaced in the vehicle rearward direction, the vehicle forward-side portions of the surge tank 6 and the intake air introduction pipe 7 are entirely crushed or collapsed as illustrated in FIG. 8C.

Through the collapse of the vehicle forward-side portions of the surge tank 6 and the intake air introduction pipe 7, an impact of the inter-component collision is significantly absorbed.

Because the impact of the inter-component collision is significantly absorbed by the vehicle forward-side portions of the surge tank 6 and the intake air introduction pipe 7, a vehicle rearward-side portion of the intake manifold 2 is neither collapsed nor displaced in the vehicle rearward direction, as illustrated in FIG. 8C. In this way, it becomes possible to effectively prevent the occurrence of a situation where the intake manifold 2 comes into interference with the fuel distribution pipe 3.

As described above, in the above embodiment, during a vehicle frontal collision, the protruding portions 60 can serve as starting points for fracture of the vehicle forward-side portion of the intake manifold 2, so that it becomes possible to smoothly expand a fracture area from the starting points to the entire vehicle forward-side portion of the intake manifold 2, thereby facilitating fracture of the vehicle forward-side portion of the intake manifold 2. This makes it possible to enhance impact absorption capability of the vehicle forward-side portion of the intake manifold 2 to thereby suppress deformation of the vehicle rearward-side portion of the intake manifold 2 and sufficiently suppress the occurrence of a situation where the vehicle rearward-side portion of the intake manifold 2 comes into interference with the fuel distribution pipe 3.

In the above embodiment, the protruding portions 60 are provided on the vehicle forward-side surface of the surge tank 6, so that it becomes possible to allow the vehicle forward-side portion of the surge tank 6 to be easily fractured. This makes it possible to sufficiently absorb an impact of the inter-component collision by the vehicle forward-side portion of the surge tank 6 having a relatively large surface area, to thereby more reliably suppress the occurrence of the situation where the intake manifold 2 comes into interference with the fuel distribution pipe 3.

In the above embodiment, the two protruding portions 60 are provided, respectively on both sides of the central region of the surge tank 6 in the cylinder row direction C, so that it becomes possible to evenly fracture the vehicle forward-side portion of the surge tank 6 having a relatively large surface area, to further enhance impact absorption capability of the surge tank 6.

In the above embodiment, the raised portion 61 and the protruding portions 60 serve as starting points for fracture of the vehicle forward-side portion of the intake manifold 2, so that it becomes possible to allow the vehicle forward-side portion of the intake manifold 2 to be more easily fractured. This makes it possible to further enhance the impact absorption capability of the vehicle forward-side portion of the intake manifold 2.

In the above embodiment, respective central regions of the surge tank 6 and the intake air introduction pipe 7 in the cylinder row direction C serve as starting points for fracture, so that it becomes possible to expand a fracture area from the central regions of the surge tank 6 and the intake air introduction pipe 7 in the cylinder row direction C to the entire intake manifold 2, thereby further enhancing the impact absorption capability of the intake manifold 2.

In the above embodiment, the front divided segment 21 is set to have strength less than that of the rear divided segment 20, i.e., the front divided segment 21 is configured to be more deformable than the rear divided segment 20, so that it becomes possible to absorb an impact of an inter-component collision by the front divided segment 21 to suppress deformation of the rear divided segment 20. This makes it possible to more reliably suppress the occurrence of the situation where the intake manifold 2 comes into interference with the fuel distribution pipe 3.

In the above embodiment, the load-receiving member 14 receives and stops the intake air introduction pipe 7 during a vehicle frontal collision, so that it becomes possible to suppress movement of the intake air introduction pipe 7 during the vehicle frontal collision. This makes it possible to easily fracture the vehicle forward-side portion of the surge tank 6 even if the intake manifold 2 is in a cantilevered state.

Although the above embodiment has been described based on an example where EGR gas is supplied to the gas introduction passage 8, the present invention is not limited thereto. For example, blow-by gas after being subjected to removal of lubricating oil through the oil separator 16 or purge gas obtained by purging vaporized fuel adsorbed and held by a canister (not illustrated) may be supplied to the gas introduction passage 8.

Although the above embodiment has been described based on an example where the protruding portion 60 is formed in a truncated quadrangular pyramid shape, the present invention is not limited thereto. For example, the protruding portion 60 may be formed in any other suitable shape, such as a circular truncated cone shape, a columnar shape or a quadrangular prism shape.

Although the above embodiment has been described based on an example where the curved region 611 of the lower raised section 61b protrudes in the vehicle forward direction with respect to the protruding portions 60, the present invention is not limited thereto. Each of the protruding portions 60 may protrude in the vehicle forward direction with respect to the curved region 611 of the lower raised section 61b, or a position of the distal end of the protruding portion 60 in the vehicle forward-rearward direction A may be coincident with a position of a vehicle forwardmost-side edge of the curved region 611.

Outline of Embodiment

Last of all, the distinctive features of the engine intake apparatus disclosed in the above embodiment and functions/effects of the features will be outlined.

The above embodiment discloses an intake apparatus for an engine transversely mounted within an engine compartment at a front of a vehicle in such a manner as to allow a cylinder row direction to be oriented in a vehicle width direction. The intake apparatus comprises: an intake manifold made of a synthetic resin and disposed on a front side of the engine, the engine front side being a front side of the vehicle; and a fuel distribution pipe disposed between the engine and the intake manifold to extend in the cylinder row direction and capable of delivering fuel to respective cylinders of the engine; wherein the intake manifold has a protruding portion provided on a front surface thereof to protrude from the front surface in a vehicle forward direction, wherein the protruding portion is provided at a position capable of allowing a member disposed in front of the intake manifold to come into collision therewith in the event of a vehicle frontal collision.

In the above intake apparatus, during a vehicle frontal collision, the protruding portion can serve as a starting point for fracture of a front portion of the intake manifold, so that it becomes possible to smoothly expand a fracture area from the starting point to the entire front portion of the intake manifold, thereby facilitating fracture of the front portion of the intake manifold. This makes it possible to enhance impact absorption capability of the front portion of the intake manifold to thereby suppress deformation of a rear portion of the intake manifold and sufficiently suppress the occurrence of a situation where the rear portion of the intake manifold comes into interference with the fuel distribution pipe (fuel rail).

Preferably, in the above intake apparatus, the intake manifold comprises: a plurality of intake pipes connected, respectively, to a plurality of intake ports of a cylinder head of the engine; a surge tank connected to respective upstream ends of the plurality of intake pipes and extending in the cylinder row direction; and an intake air introduction pipe capable of introducing fresh air to the surge tank, wherein the protruding portion is provided on a front surface of the surge tank.

According to this feature, the protruding portion is provided on the front surface of the surge tank, so that it becomes possible to allow the front portion of the surge tank to be easily fractured. This makes it possible to sufficiently absorb an impact of an inter-component collision by the front portion of the surge tank having a relatively large surface area, to thereby more reliably suppress the occurrence of the situation where the intake manifold comes into interference with the fuel distribution pipe.

Preferably, in the above intake apparatus, the protruding portion is provided on each of both sides of a central region of the surge tank in the cylinder row direction.

According to this feature, it becomes possible to evenly fracture the vehicle forward-side portion of the surge tank having a relatively large surface area, to further enhance impact absorption capability of the surge tank.

Preferably, in the intake apparatus, the intake manifold is internally provided with a gas introduction passage capable of introducing gas to an upstream region of the intake air introduction pipe, wherein the gas introduction passage is defined by using, as a passage wall, a part of outer walls of the surge tank and the intake air introduction pipe, thereby forming a raised portion on the front surface of the surge tank and a front surface of the intake air introduction pipe in such a manner as to be raised from the respective front surfaces in the vehicle forward direction.

According to this feature, the raised portion and the protruding portion serve as starting points for fracture of the front portion of the intake manifold during a vehicle frontal collision, so that it becomes possible to allow the front portion of the intake manifold to be more easily fractured. This makes it possible to provide the gas introduction passage inside the intake manifold, and utilize this structure so as to enhance the impact absorption capability of the front portion of the intake manifold.

Preferably, in the above intake apparatus, the intake air introduction pipe is connected to a central region of the surge tank in the cylinder row direction, wherein the raised portion is formed both on the front surface of the surge tank and the front surface of the intake air introduction pipe, along a position of the central region.

According to this feature, respective central regions of the surge tank and the intake air introduction pipe in the cylinder row direction serve as starting points for fracture, so that it becomes possible to expand a fracture area from a central region of the intake manifold in the cylinder row direction to the entire intake manifold, thereby further enhancing the impact absorption capability of the intake manifold.

Preferably, in the intake apparatus, the intake manifold comprises a rear divided segment on a near side with respect to the engine, and a front divided segment on a far side with respect to the engine, wherein the front divided segment is set to have strength less than that of the rear divided segment.

According to this feature, the front divided segment is configured to be more deformable than the rear divided segment, so that it becomes possible to absorb an impact of an inter-component collision by the front divided segment to suppress deformation of the rear divided segment. This makes it possible to more reliably suppress the occurrence of the situation where the intake manifold comes into interference with the fuel distribution pipe.

Preferably, in the above intake apparatus, the intake pipes are fixed to the cylinder head, whereby the intake manifold is supported by the cylinder head in a cantilevered state.

Generally, a knock sensor operable to detect knocking is installed in a cylinder block of the engine. In the cantilevered state, the cylinder block and the intake air introduction pipe are not directly coupled together. This prevents a change in rigidity of the cylinder block in the vicinity of an installation area of the knock sensor. Thus, it becomes possible to allow the knock sensor to accurately detect knocking. It also becomes possible to suppress the occurrence of a situation where vibration is input from the cylinder block into a throttle valve requiring high opening-closing accuracy for controlling a power output of the engine.

Preferably, the above intake apparatus comprises a load-receiving member provided in a vicinity of the intake air introduction pipe to receive and stop the intake air introduction pipe during the vehicle frontal collision.

According to this feature, the load-receiving member receives and stops the intake air introduction pipe during a vehicle frontal collision, so that it becomes possible to suppress movement of the intake air introduction pipe during the vehicle frontal collision, and positively generate a shear force in a weakened portion to promote fracture of the weakened portion. The promotion of fracture of the weakened portion makes it possible to promote impact absorption by means of fracture of the weakened portion.

This application is based on Japanese Patent application No. 2014-240275 filed in Japan Patent Office on Nov. 27, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An intake apparatus for an engine transversely mounted within an engine compartment at a front of a vehicle in such a manner as to allow a cylinder row direction to be oriented in a vehicle width direction, comprising:
   an intake manifold made of a synthetic resin and disposed on a front side of the engine, the engine front side being a front side of the vehicle; and
   a fuel distribution pipe disposed between the engine and the intake manifold to extend in the cylinder row direction and capable of delivering fuel to respective cylinders of the engine;
   wherein the intake manifold has a protruding portion provided on a front surface thereof to protrude from the front surface in a vehicle forward direction, the protruding portion being provided at a position capable of allowing a member disposed in front of the intake manifold to come into collision therewith in the event of a vehicle frontal collision, the protruding portion is formed in a quadrangular shape as viewed from a front side of the vehicle.

2. The intake apparatus as recited in claim 1, wherein the intake manifold comprises: a plurality of intake pipes connected, respectively, to a plurality of intake ports of a cylinder head of the engine; a surge tank connected to respective upstream ends of the plurality of intake pipes and extending in the cylinder row direction; and an intake air introduction pipe capable of introducing intake air to the surge tank, and wherein the protruding portion is provided on a front surface of the surge tank.

3. The intake apparatus as recited in claim 2, wherein the protruding portion is provided on each of both sides of a central region of the surge tank in the cylinder row direction.

4. The intake apparatus as recited in claim 2, wherein the intake manifold is internally provided with a gas introduction passage capable of introducing gas to an upstream region of the intake air introduction pipe, the gas introduction passage being defined using, as a passage wall, a part of outer walls of the surge tank and the intake air introduction pipe, thereby forming a raised portion on the front surface of the surge tank and a front surface of the intake air introduction pipe in such a manner as to be raised from the respective front surfaces in the vehicle forward direction.

5. The intake apparatus as recited in claim 4, wherein the intake air introduction pipe is connected to a central region of the surge tank in the cylinder row direction, and wherein the raised portion is formed both on the front surface of the surge tank and the front surface of the intake air introduction pipe, along a position of the central region.

6. The intake apparatus as recited in claim 1, wherein the intake manifold comprises a rear divided segment on a near side with respect to the engine, and a front divided segment on a far side with respect to the engine, the front divided segment being set to have strength less than that of the rear divided segment.

7. The intake apparatus as recited in claim 2, wherein the intake pipes are fixed to the cylinder head, whereby the intake manifold is supported by the cylinder head in a cantilevered state.

8. The intake apparatus as recited in claim 7, which comprises a load-receiving member provided in a vicinity of the intake air introduction pipe to receive and stop the intake air introduction pipe during the vehicle frontal collision.

9. The intake apparatus as recited in claim 1, wherein the protruding portion is formed in a truncated quadrangular pyramid shape tapered in the vehicle forward direction.

10. The intake apparatus as recited in claim 9, wherein the intake manifold comprises:
    a plurality of intake pipes connected, respectively, to a plurality of intake ports of a cylinder head of the engine;
    a surge tank connected to respective upstream ends of the plurality of intake pipes and extending in the cylinder row direction; and
    an intake air introduction pipe capable of introducing intake air to the surge tank, and wherein the protruding portion is provided on a front surface of the surge tank,
    the protruding portion is internally hollowed, and a vehicle rearward-side end of the protruding portion is opened to an internal space of the surge tank.

11. An intake apparatus for an engine transversely mounted within an engine compartment at a front of a vehicle in such a manner as to allow a cylinder row direction to be oriented in a vehicle width direction, comprising:
    an intake manifold made of a synthetic resin and disposed on a front side of the engine, the engine front side being a front side of the vehicle; and
    a fuel distribution pipe disposed between the engine and the intake manifold to extend in the cylinder row direction and capable of delivering fuel to respective cylinders of the engine;
    a plurality of intake pipes connected, respectively, to a plurality of intake ports of a cylinder head of the engine;
    a surge tank connected to respective upstream ends of the plurality of intake pipes and extending in the cylinder row direction;
    an intake air introduction pipe capable of introducing intake air to the surge tank,
    wherein the intake manifold has a gas introduction passage capable of introducing gas to an upstream region of the intake air introduction pipe,
    the gas introduction passage has a raised portion on the front surface of the surge tank and a front surface of the intake air introduction pipe in such a manner as to be raised from the respective front surfaces in the vehicle forward direction.

12. The intake apparatus as recited in claim 11, wherein the intake manifold has a protruding portion provided on a front surface thereof to protrude from the front surface in a vehicle forward direction, the protruding portion being provided at a position capable of allowing a member disposed in front of the intake manifold to come into collision therewith in the event of a vehicle frontal collision.

13. The intake apparatus as recited in claim 12, wherein the protruding portion is provided on a front surface of the surge tank.

14. The intake apparatus as recited in claim 11, wherein the raised portion includes an inclined region having a protruding length which gradually increases in a downward direction.

15. The intake apparatus as recited in claim 11, wherein the raised portion has an upper raised section and a lower raised section,
    the upper raised section has protruding length in the vehicle forward direction evenly protruding from the front surface of the surge tank,
    the lower raised section includes an inclined region having a protruding length which gradually increases in a downward direction, and a curved region curved from a lower end of the inclined region toward the intake air introduction pipe,
    a protruding length in the vehicle forward direction of a part of the curved region maximally protruding in the vehicle forward direction is greater than each of the protruding length of the upper raised section and the protruding length of the protruding portion.

16. An intake apparatus for an engine transversely mounted within an engine compartment at a front of a vehicle in such a manner as to allow a cylinder row direction to be oriented in a vehicle width direction, comprising:
    an intake manifold made of a synthetic resin and disposed on a front side of the engine, the engine front side being a front side of the vehicle; and
    a fuel distribution pipe disposed between the engine and the intake manifold to extend in the cylinder row direction and capable of delivering fuel to respective cylinders of the engine;
    wherein the intake manifold comprises:

a plurality of intake pipes connected, respectively, to a plurality of intake ports of a cylinder head of the engine;

a surge tank connected to respective upstream ends of the plurality of intake pipes and extending in the cylinder row direction; and an intake air introduction pipe capable of introducing intake air to the surge tank, the intake air introduction pipe has a weakened portion formed in the vicinity of the upstream end of the intake air introduction pipe.

17. The intake apparatus as recited in claim 16, wherein the weakened portion is a thin-walled portion formed by reducing a wall thickness of the intake air introduction pipe over the entire circumference thereof.

18. The intake apparatus as recited in claim 16, wherein the intake manifold has a gas introduction passage capable of introducing gas to an upstream region of the intake air introduction pipe, the gas introduction passage has a raised portion on the front surface of the surge tank and a front surface of the intake air introduction pipe in such a manner as to be raised from the respective front surfaces in the vehicle forward direction.

19. The intake apparatus as recited in claim 18, wherein the intake manifold has a protruding portion provided on a front surface thereof to protrude from the front surface in a vehicle forward direction, the protruding portion being provided at a position capable of allowing a member disposed in front of the intake manifold to come into collision therewith in the event of a vehicle frontal collision.

20. The intake apparatus as recited in claim 19, wherein the intake manifold comprises:

a throttle body connected a lower end of the intake air introduction pipe, a vehicle forward most-side edge of the throttle body protrudes in the vehicle forward direction with respect to each of the protruding portion and the raised portion.

* * * * *